United States Patent Office 3,364,230
Patented Jan. 16, 1968

3,364,230
NOVEL PHOSPHORYLATED 2-IMINO-
1,3-DITHIOLES
Roger William Addor, Pennington, N.J., assignor to
American Cyanamid Company, Stamford, Conn.,
a corporation of Maine
No Drawing. Filed Apr. 21, 1966, Ser. No. 544,097
4 Claims. (Cl. 260—327)

The present invention relates to novel phosphinyl imides, to processes for their preparation, to novel pest control compositions and to a method for controlling pests with said novel composition. More particularly, the invention relates to novel phosphorylated 2-imino-1,3-dithioles represented by the general formula:

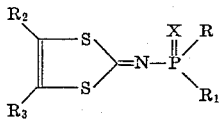

wherein R and $R_1$ are each lower alkyl, lower alkoxy, lower alkylthio, aryl or the radical $R_4$, $R_5$, N— in which $R_4$ and $R_5$ are each hydrogen or lower alkyl, $R_2$ and $R_3$ are each hydrogen, lower alkyl or phenyl, each of said Rs being the same or different, and wherein X is either oxygen or sulfur.

The phosphorylated imides of the present invention are found to possess good insecticidal, acaricidal, nematocidal and herbicidal properties.

Illustrative compounds of the present invention include:

2-diethoxyphosphinylimino-1,3-dithiole,
2-dimethoxyphosphinothioylimino-1,3-dithiole,
2-diethoxyphosphinylimino-4-methyl-1,3-dithiole,
2-di-isopropoxyphosphinylimino-4-methyl-1,3-dithiole,
2-n-propoxyphosphinothioylimino-4-methyl-1,3-dithiole,
2-ethoxyethylphosphinylimino-4-methyl-1,3-dithiole,
2-dimethoxyphosphinylimino-4-methyl-1,3-dithiole,
2-diethoxyphosphinothioylimino-4-methyl-1,3-dithiole,
2-dimethoxyphosphinothioylimino-4-methyl-1,3-dithiole,
2-diethoxyphosphinylimino-4,5-dimethyl-1,3-dithiole,
2-diethoxyphosphinylimino-4-methyl-5-phenyl-1,3-dithiole,
2-diethoxyphosphinylimino-4-n-butyl-1,3-dithiole,
2-ethoxydimethylaminophosphinothioylimino-4-methyl-1,3-dithiole,
2-ethoxyphenylphosphinothioylimino-4-methyl-1,3-dithiole, and
2-diethylphosphinothioylimino-4-methyl-1,3-dithiole.

According to the process of the invention, the compounds as hereinabove named can be prepared by bringing into reactive combination in substantially equimolar proportions (a) a 2-amino-1,3-dithiole salt and (b) an appropriate phosphorus-containing compound, such as an O,O-dialkylphosphorohalothioate, O,O-dialkylphosphorohaloate, O-alkyl alkanephosphonohalothioate, O-alkyl-N-mono-alkylphosphoroamidohaloate, O-alkyl-N,N-dialkylphosphoroamidohalothioate, N,N' - dialkylphosphorodiamidohalothioate, O-alkyl phenylphosphonohalothioate, O,O-diphenylphosphorohaloate, and equivalents thereof.

The overall reaction may be graphically illustrated as follows:

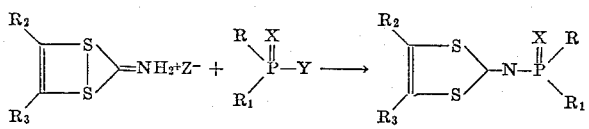

where R, $R_1$, $R_2$ and $R_3$ as well as X are the same as hereinabove defined; and Y and Z are each halogen, such as fluoro, chloro, bromo or iodo.

Exemplary phosphorus-containing compounds employed as a reactant herein are, for instance:

O,O-dimethyl phosphorochloridothioate,
O,O-diethyl phosphorochloridothioate,
O-methyl, O-ethyl phosphorochloridothioate,
O,O-di-isopropyl phosphorobromidothioate,
O,O-di-n-butyl phosphorochloridothioate,
O,O-di-sec-pentyl phosphoroiodothioate,
O,O-dimethyl phosphorochloridate,
O,O-diethyl phosphorochloridate,
O-ethyl ethane phosphonochloridothioate,
O-ethyl-N,N-dimethyl phosphoramidochloridothioate,
O-ethyl, phenylphosphonochloridothioate,
O-ethyl-N-isopropyl phosphoramidochloridothioate,
O-ethyl-N-methyl phosphoramidochloridothioate,
Diethylphosphorochloridotrithioate, and
Diethylphosphinothioyl bromide.

Illustrative of te 2-imino-1,3-dithiole salts are:

2-imino-4-methyl-1,3-dithiole hydrochloride,
2-imino-4-methyl-1,3-dithiole hydrobromide,
2-imino-4,5-dimethyl-1,3-dithiole hydrochloride,
2-imino-4-n-propyl-1,3-dithiole hydrochloride,
2-imino-4-methyl-5-phenyl-1,3-dithiole hydrochloride, and equivalents of the foregoing.

Alternatively, the compounds of the invention can also be prepared by reacting in substantially equimolar proportions an isocyanide dihalide of the formula:

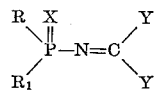

with an alkali metal salt of cis-1,2-dimercaptoethylene of the formula:

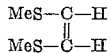

to obtain the desired compound of the formula:

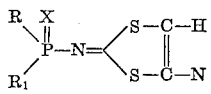

where R, $R_1$, X and Y are defined hereinabove and Me is an alkali metal, such as sodium, potassium or lithium.

For a further understanding of the present invention, the following illustrative examples are presented.

EXAMPLE 1

*Preparation of 2-diethoxyphosphinylimino-1,3-dithiole*

To a mixture of 9.5 parts of the sodium salt of cis-1,2-dimercaptoethylene in 80 parts of absolute ethanol under a nitrogen atmosphere is added over 45 minutes 16.7 parts of diethoxyphosphorylisocyanide dichloride in 35 parts of anhydrous ether. The mixture is stirred overnight, treated with activated charcoal, filtered and concentrated in vacuo to leave 18.3 parts of crude product. Molecular distillation at 90°–120° C./.001 mm. Hg yields 5.8 parts of crystalline 2-diethoxyphosphinylimino-1,3-dithiole. The latter, when recrystallized from ether in a Dry Ice-acetone bath, yields crystals melting at 46.6° C.–48.0° C. Its infrared spectrum, further, shows strong absorption at 1550 cm.$^{-1}$ assignable to the C=N group.

EXAMPLE 2

*Preparation of 2-dimethoxyphosphinothioylimino-1,3-dithiole*

The procedure of Example 1 is followed in every detail except that the appropriate amount of dimethoxythiophosphorylisocyanide dichloride replaces diethoxyphosphorylisocyanide dichloride. On molecular distillation of the crude product at 100° C./.001 mm. Hg, there is obtained an oily product which crystallizes on standing. Typical C=N absorption appears at 1550 cm.$^{-1}$ in the infrared spectrum.

EXAMPLE 3

*Preparation of 2-diethoxyphosphinylimino-4-methyl-1,3-dithiole*

To a stirred mixture of 9.0 parts of 2-imino-4-methyl-1,3-dithiole hydrochloride in 15 parts of water and 75 parts of benzene is added 11.8 parts of potassium bicarbonate followed by 9.7 parts of diethyl phosphorochloridate. After stirring the mixture overnight, the organic phase is separated and washed successively with dilute hydrochloric acid, dilute sodium hydroxide solution, water, and, finally, with a saturated salt solution. After filtering the mixture through sodium sulfate, concentration in vacuo leaves 13.0 grams (91% of theory) of 2-diethoxyphosphinylimino-4-methyl-1,3-dithiole as a clear tan oil having an index of refraction ($n_D^{25}$) equal to 1.5398. The compound is pure by thin-layer chromatography on silica gel. Upon analysis, the following is found—

Calcd. for $C_8H_{14}NO_3PS_2$: C, 35.94; H, 5.28; N, 5.24; P, 11.59; S, 23.99. Found: C, 35.74; H, 5.33; N, 5.04; P, 11.82; S, 23.85.

The infrared spectrum shows strong absorption at 1525 cm.$^{-1}$ assignable to the C=N group.

EXAMPLE 4

*Preparation of 2-di-isopropoxyphosphinylimino-4-methyl-1,3-dithiole*

The procedure of Example 3 is followed in every detail except that the appropriate amount of di-isopropyl phosphorochloridate replaces diethyl phosphorochloridate. The crude product is recrystallized from 1:1 ether-petroleum ether to obtain a 77% yield of pale yellow crystals, melting at 31° C.–32° C.

*Analysis.*—Calculated for $C_{10}H_{18}NO_3PS_2$: C, 40.66; H, 6.14; N, 4.74; P, 10.49; S, 21.71. Found: C, 40.61; H, 6.12; N, 4.83; P, 10.36; S, 21.85.

EXAMPLE 5

*Preparation of 2-n-propoxyphosphinothioylimino-4-methyl-1,3-dithiole*

The procedure of Example 3 is again followed in every detail except that the appropriate amount of di-n-propyl phosphorochloridothioate replaces diethyl phosphorochloridate. The crude product is purified by chromatography on silica gel employing carbon tetrachloride-chloroform mixture for elution. The pure material is a colorless oil, having a refractive index ($n_D^{25}$) equal to 1.5775.

*Analysis.*—Calculated for $C_{10}H_{18}NO_2PS_3$: C, 38.56; H, 5.82; N, 4.50; P, 9.95; S, 30.89. Found: C, 38.70; H, 5.76; N, 4.40; P, 10.02; S, 30.89.

EXAMPLE 6

*Preparation of 2-ethoxyethylphosphinylimino-4-methyl-1,3-dithiole*

Once again the procedure of Example 3 is followed in every detail except that the appropriate amount of O-ethyl ethylphosphinyl chloride replaces diethyl phosphorochloridate. The crude product is treated with activated charcoal in methanol and, after removal of the solvent, is recrystallized from an ether-petroleum-ether mixture. The yield of light yellow crystals, whose melting point is 49° C.–50° C., is 49%.

*Analysis.*—Calculated for $C_8H_{14}NO_2PS_2$: C, 38.23; H, 5.62; N, 5.57; P, 12.33; S, 25.52. Found: C, 38.34; H, 5.63; N, 5.61; P, 12.37; S, 25.70.

EXAMPLE 7

*Preparation of 2-dimethoxyphosphinylimino-4-methyl-1,3-dithiole*

Repeating the procedure of Example 3 in every material detail except that the appropriate amount of dimethyl phosphorochloridate replaces diethyl phosphorochloride, there is obtained an oily product, whose index of refraction ($n_D^{25}$) equals 1.5725. On analysis, the following is found.

Calcd. for $C_6H_{10}NO_3PS_2$: C, 30.12; H, 4.21; N, 5.85; P, 12.95; S, 26.80. Found: C, 30.32; H, 4.29; N, 5.68; P, 13.04; S, 27.00.

EXAMPLE 8

*Preparation of 2-diethoxyphosphinothioylimino-4-methyl-1,3-dithiole*

To a well-stirred mixture of 14.4 parts of O,O-diethylphosphorochloridothioate and 16 parts of potassium bicarbonate in 20 parts of water and 100 parts of benzene is added 12.2 grams of 2-imino-4-methyl-1,3-dithiole hydrochloride in several portions. After heating the mixture at 40° C. for three to four hours, the organic phase is separated and washed successively with dilute hydrochloric acid, dilute sodium hydroxide solution, water, and saturated salt solution. After filtering the mixture through anhydrous sodium sulfate, evaporation of solvent in vacuo leaves 18.9 grams of crude product. The crude product, in 50 milliliters of methanol, is cooled to −30° C. and the resulting solids are collected on a filter. The solids melt at room temperature and the oil is freed of any remaining solvent under vacuum to give 8.3 grams of pure 2 - diethoxyphosphinothioylimino-4-methyl-1,3-dithiole as a clear orange oil. The mother liquor is concentrated, diluted with water, and reconcentrated on a film evaporator at 40° C. under vacuum to give an additional 4.8 grams of product free of O,O-diethylphosphorochloridothioate starting material; total yield 13.1 grams or 64% of theory. The infrared and proton magnetic resonance spectra are consistent with the assigned structure of the oily product, whose index of refraction ($n_D^{25}$) equals 1.5865. On analysis, the following is found.

Calcd. for $C_8H_{14}NO_2PS_3$: C, 33.90; H, 4.99; N, 4.94; P, 10.93; S, 33.94. Found: C, 33.85; H, 5.09; N, 4.67; P, 10.81; S, 34.00.

EXAMPLE 9

*Preparation of 2-dimethoxyphosphinothioylimino-4-methyl-1,3-dithiole*

The reaction is carried out as in Example 8 except that O,O-dimethylphosphorochloridothioate replaces O,O-diethylphosphorochloridothioate. The crude oily product is freed of impurities by first washing with hexane and then by slurrying a benzene solution of the material with activated carbon and acid alumina. The structure of the product obtained as an oil, $n_D^{25}$=1.6210, after stripping off the benzene is consistent with the infrared and proton magnetic resonance spectra. On analysis, the following is found.

Calcd. for $C_6H_{10}NO_2PS_3$: C, 28.23; H, 3.95; N, 5.49; P, 12.14; S, 37.68. Found: C, 28.46; H, 4.00; N, 5.70; P, 12.30; S, 37.80.

EXAMPLE 10

*Preparation of 2-diethoxyphosphinylimino-4,5-dimethyl-1,3-dithiole*

The procedure of Example 3 is followed in every detail except that the appropriate amount of 2-imino-4,5-dimethyl-1,3-dithiole hydrochloride replaces 2-imino-4-methyl-1,3-dithiole hydrochloride. The crude product solidifies and is recrystallized from hexane to give colorless 2-diethoxyphosphinylimino-4,5-dimethyl-1,3-dithiole, melting point 50.0° C.–51.5° C. On analysis, the following is found.

Calcd. for $C_9H_{16}NO_3PS_2$: C, 38.43; H, 5.73; N, 4.98;

P, 11.01; S, 22.80. Found: C, 38.21; H, 5.58; N, 4.94; P, 10.97; S, 22.76.

EXAMPLE 11

*Preparation of 2-diethoxyphosphinylimino-4-methyl-5-phenyl-1,3-dithiole*

The procedure of Example 3 is followed in every detail except that the appropriate amount of 2-imino-4-methyl-5-phenyl-1,3-dithiole hydrochloride replaces 2-imino-4-methyl-1,3-dithiole hydrochloride. The infrared and proton magnetic resonance spectra are consistent with the assigned structure of the oily product, $n_D^{25}=1.5937$. On analysis, the following is found.

Calcd. for $C_{14}H_{18}NO_3PS_2$: C, 48.97; H, 5.28; N, 4.08; P, 9.02; S, 18.67. Found: C, 48.94; H, 5.49; N, 4.19; P, 9.14; S, 18.38.

EXAMPLE 12

*Preparation of 2-diethoxyphosphinylimino-4-n-butyl-1,3-dithiole*

The procedure of Example 3 is followed in every detail except that the appropriate amount of 2-imino-4-n-butyl-1,3-dithiole hydrochloride replaces 2-imino-4-methyl-1,3-dithiole hydrochloride. The structure of the product, obtained as a yellow oil whose index of refraction ($n_D^{25}$) equals 1.5333, is supported by the infrared and proton magnetic resonance spectra. On analysis, the following is found.

Calcd. for $C_{11}H_{20}NO_3PS_2$: C, 42.69; H, 6.51; N, 4.53; P, 10.01; S, 20.72. Found: C, 42.79; H, 6.90; N, 4.55; P, 10.13; S, 20.79.

EXAMPLE 13

*Preparation of 2-ethoxydimethylaminophosphinothioylimino-4-methyl-1,3-dithiole*

The procedure of Example 3 is followed in every detail except that the appropriate amount of N,N-dimethyl-O-ethyl-phosphoramidochloridothioate replaces diethyl phosphorochloridate. The low melting solid obtained from molecular distillation of the crude product shows typical C=N absorption at 1550 cm.$^{-1}$ in the infrared spectrum.

EXAMPLE 14

*Preparation of 2-ethoxyphenylphosphinothioylimino-4-methyl-1,3-dithiole*

The procedure of Example 3 is followed in every detail except that the appropriate amount of O-ethyl phenylphosphorochloridothioate replaces diethyl phosphorochloridate. The oily product, used without further purification, shows the expected C=N absorption at 1530 cm.$^{-1}$ in the infrared spectrum.

EXAMPLE 15

*Preparation of 2-ethoxymethylaminophosphinothioylimino-4-methyl-1,3-dithiole*

The procedure of Example 3 is followed in every detail except that the appropriate amount of O-ethyl-N-methyl-phosphoramidochloridothioate replaces diethyl phosphorochloridate. The molecularly distilled product is an oil showing typical C=N absorption at 1550 cm.$^{-1}$ in the infrared spectrum.

EXAMPLE 16

*Preparation of 2-diethylphosphinothioylimino-4-methyl-1,3-dithiole*

The procedure of Example 3 is followed in every detail except that the appropriate amount of diethyl phosphinothioyl bromide replaces diethyl phosphorochloridate. Molecular distillation of the crude oil affords product having typical C=N absorption at 1550 cm.$^{-1}$ in the infrared spectrum.

To illustrate the pesticidal activity as well as the mammalian toxicity of the phosphinyl imides of the present invention, the following examples are presented.

EXAMPLE 17

Varying quantities of four representative compounds are fed to mice orally and the lethal dose (LD$_{50}$) determined. The compounds employed are: 2-dimethoxyphosphinothioylimino-4-methyl-1,3-dithiolane, 2-diethoxyphosphinothioylimino-4-methyl-1,3-dithiolane, 2-dimethoxyphosphinothioylimino-4-methyl-1,3-dithiole and 2-diethoxyphosphinothioylimino-4-methyl-1,3-dithiole. They are found to possess a lethal dosage equal to 45 mg./kg., 14 mg./kg., 170 mg./kg. and 157 mg./kg., respectively. This clearly indicates that the lethal dosage which is substantially higher for the unsaturated dithiole heterocyclic moiety derivatives are superior to the corresponding dithiolane derivatives insofar as mammalian toxicity is concerned.

EXAMPLE 18

The effectiveness of the compounds of the instant invention in controlling Southern Armyworm (*Prodenia eridania* Cram.) is demonstrated by the following test wherein test compounds are made up as 0.1%, 0.01% and 0.001% solutions in 65% acetone/35% water, Sieva lima bean leaves are dipped in the separate test solutions and set in a hood to dry. When dry, they are placed in four-inch petri dishes which have a moist filter paper and ten third-instar armyworms larvae about ⅜ inch long are added to each dish. The dishes are covered and held at 80° F., 60% R.H. for two days. On termination of the holding period, mortality counts and estimates of the amount of feeding are made. The results of the test are provided in Table I below.

TABLE I

| Compounds | Armyworms, Percent Kill | | |
|---|---|---|---|
| | 0.1% | 0.01% | 0.001% |
| 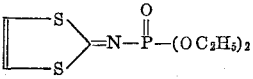 | 100 | 100 | 100 |
| 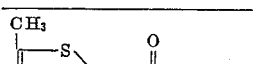 | 100 | 100 | 80 |
|  | 100 | 100 | 0 |
| 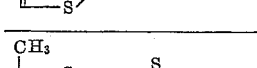 | 100 | 100 | 0 |
| 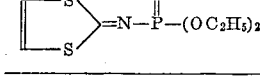 | 60 | 0 | 0 |
| 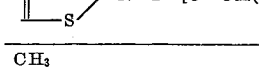 | 70 | 0 | 0 |
| 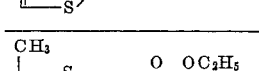 | 90 | 0 | 0 |

EXAMPLE 19

The utilization of the compounds of the instant invention with respect to aphids is demonstrated by the following tests wherein 0.01%, 0.001% and 0.0001% solutions of the test compounds are made up in 65% acetone/35% water and applied to vigorously growing nasturtium plants approximately two inches tall and infested with bean aphids (*Aphis fabae* Scopoli) two days prior to treatment. After spraying, the test plants are laid on their sides on white enamel trays, coated at their edges with oil and placed in a constant temperature and humidity room for a two-day holding period. During this period, the temperature is maintained at about 70° F. and R.H. is held at approximately 50%. On termination of the test period, the mortality count is made and recorded in Table II below.

sieva lima bean plants with the first pair of leaves developed. Five hours prior to application of the test solution, the various plants are infested with from 100 to 200 mites per leaf. Application of the test solutions to the infested plants is accomplished by dipping said leaves in the test solutions for approximately three seconds and lacing the dipped leaf in a hood to dry. Following treatment, the plants are placed in a constant temperature and humidity room 80° F. and 60% R.H. for two days, then examined under a 10× binocularscope to determine the percent mortality achieved. One of the test leaves from each plant is retained for an addiitonal five days and again examined to estimate the kill of eggs and newly hatched nymphs.

TABLE II

| Compounds | Aphids, Percent Kill | | |
|---|---|---|---|
| | 0.01% | 0.001% | 0.0001% |
| [thiazoline]=N—P(=O)—(OC$_2$H$_5$)$_2$ with two S | 100 | 100 | 60 |
| CH$_3$-[thiazoline]=N—P(=S)—(OC$_2$H$_5$)$_2$ | 100 | 100 | 10 |
| CH$_3$-[thiazoline]=N—P(=O)—(OCH$_3$)$_2$ | 100 | 100 | 50 |
| CH$_3$-[thiazoline]=N—P(=S)—(OCH$_3$)$_2$ | 100 | 98 | 35 |
| CH$_3$-[thiazoline]=N—P(=O)—(OC$_2$H$_5$)$_2$ | 100 | 100 | 15 |
| CH$_3$-[thiazoline]=N—P(=O)—[O—CH(CH$_3$)$_2$]$_2$ | 100 | 98 | 15 |
| CH$_3$-[thiazoline]=N—P(=S)—(OCH$_2$CH$_2$CH$_3$)$_2$ | 100 | 98 | 0 |
| CH$_3$-[thiazoline]=N—P(=O)(OC$_2$H$_5$)(C$_2$H$_5$) | 100 | 0 | — |

TABLE III

| Compounds | Mites, Percent Kill | | |
|---|---|---|---|
| | 0.01% | 0.001% | 0.0001% |
| [thiazoline]=N—P(=O)—(OC$_2$H$_5$)$_2$ | 100 | 100 | 100 |
| CH$_3$-[thiazoline]=N—P(=S)—(OC$_2$H$_5$)$_2$ | 100 | 100 | 100 |
| CH$_3$-[thiazoline]=N—P(=S)—(OCH$_3$)$_2$ | 100 | 90 | 0 |
| CH$_3$-[thiazoline]=N—P(=O)—[O—CH(CH$_3$)$_2$]$_2$ | 100 | 0 | — |
| CH$_3$-[thiazoline]=N—P(=S)—(OCH$_2$CH$_2$CH$_3$)$_2$ | 100 | 0 | — |
| CH$_3$-[thiazoline]=N—P(=O)(OC$_2$H$_5$)(C$_2$H$_5$) | 100 | 100 | 49 |

EXAMPLE 20

Miticidal activity of the compounds of the instant invention is demonstrated by the test wherein 0.01%, 0.001% and 0.0001% solutions of the active ingredients in 65% acetone/35% water solutions are applied to

EXAMPLE 21

To determine the effectiveness of the compounds of the instant invention for controlling the Confused Flour Beetle (*Tribolium confusum* Duv.), the large Milkweed Bug (*Oncopeltus fasciatus* Dall.), and German cockroach (*Blattella germanica* L.), test dusts containing 1% of the active ingredient to be tested are uniformly distributed on individual four-inch petri dishes. To separate dishes so treated are added 25 adult confused flour beetles (TC), 20 adult milkweed bugs (MB), and 20 adult male German cockroaches (GC). The dishes are covered, placed in a constant temperature and humidity room and maintained at 80° F. and 60% R.H. for three days. On termination of the holding period, the dishes are examined and mortality counts made. The results of these tests are provided in Table IV below.

TABLE IV

| Compounds | Percent Kill | | |
|---|---|---|---|
| | TC | MB | GC |
| [dithiolane]=N-P(=O)(OC$_2$H$_5$)$_2$ | 100 | 100 | 100 |
| CH$_3$-[dithiolane]=N-P(=O)(OC$_2$H$_5$)$_2$ | 100 | 35 | 100 |
| CH$_3$-[dithiolane]=N-P(=O)(OCH$_3$)$_2$ | 100 | 15 | 100 |
| CH$_3$-[dithiolane]=N-P(=S)(OC$_2$H$_5$)$_2$ | 100 | 0 | 100 |
| CH$_3$-[dithiolane]=N-P(=O)[O-CH(CH$_3$)$_2$]$_2$ | 50 | 90 | 95 |
| CH$_3$-[dithiolane]=N-P(=S)(OCH$_2$CH$_2$CH$_3$)$_2$ | 96 | 25 | 90 |
| CH$_3$-[dithiolane]=N-P(=O)(OC$_2$H$_5$)(C$_2$H$_5$) | 100 | 10 | 70 |

EXAMPLE 22

The systemic activity of the compounds of the invention is demonstrated by the following test wherein emulsions containing 100, 10 and 1 p.p.m. of representative compounds are prepared with a small amount of a commercial emulsifier and an acetone/water solution. The test emulsions are placed in small bottles and sieva lima bean plants with only primary leaves unfolded are cut off just above soil level and inserted into said bottles. The bean plants are held in place with a small bit of cotton wrapped around each stem. The bottles are then placed in ventilated boxes with the leaves extending outside such that fumes are drawn out of the box and thus prevented from rising and effecting the test leaves. About 50 adult two-spotted mites are placed on the leaves and permitted to remain there for three days. During this period, the temperature is maintained at about 80° F., and the R.H. held at approximately 60%. At the end of this three day holding period, the leaves are examined and mite mortality rates estimated. The results of the tests are provided in Table V below.

TABLE V

| Compounds | Systemic Rate, Percent Kill | | |
|---|---|---|---|
| | 100 p.p.m. | 10 p.p.m. | 1 p.p.m. |
| [dithiolane]=N-P(=O)(OC$_2$H$_5$)$_2$ | 100 | 100 | 100 |
| CH$_3$-[dithiolane]=N-P(=O)(OC$_2$H$_5$)$_2$ | 100 | 100 | 85 |
| CH$_3$-[dithiolane]=N-P(=S)(OCH$_3$)$_2$ | 100 | 94 | 0 |
| CH$_3$-[dithiolane]=N-P(=S)(OC$_2$H$_5$)$_2$ | 100 | 100 | 87 |
| CH$_3$-[dithiolane]=N-P(=O)[O-CH(CH$_3$)$_2$]$_2$ | 85 | 30 | 0 |
| CH$_3$-[dithiolane]=N-P(=S)(OCH$_2$CH$_2$CH$_3$)$_2$ | 0 | 0 | 0 |
| CH$_3$-[dithiolane]=N-P(=O)(OC$_2$H$_5$)(C$_2$H$_5$) | 100 | 100 | 100 |

EXAMPLE 23

The nematocidal activity of the compounds of the invention is demonstrated by the following test wherein a sufficient amount of test compound is dissolved or suspended in water to provide 0.1% and 0.01% concentrations of test compound in the water. To 4 milliliter vials of these solutions is added four drops of a vinegar suspension of vinegar eelworms (*Turbatrix aceti*). The vials are then placed on a mechanical rotating device and agitated for 24 hours. Following this exposure period, the vials are removed and examined under a microscope to determine the percent mortality achieved. The results appear in Table VI below.

TABLE VI

| Compounds | Concentration, Percent Kill | |
|---|---|---|
| | 0.1% | 0.1% |
| [dithiolane]=N-P(=O)(OC$_2$H$_5$)$_2$ | 100 | 100 |
| CH$_3$-[dithiolane]=N-P(=O)(OC$_2$H$_5$)$_2$ | 100 | 100 |
| CH$_3$-[dithiolane]=N-P(=O)(OCH$_3$)$_2$ | 100 | 100 |

It is an advantage to utilize the pesticidal compounds of the present invention in dilute concentrations by incorporating the latter compounds in a variety of inert carriers or diluents. For instance, the compound may be dissolved in an inert organic solvent such as acetone, ethyl acetate, ethyl alcohol, benzene, kerosene or equivalents thereof; or the compound may be admixed with an inert solid carrier, as for example, fuller's earth, bentonite and the like. If desired, a suspension of the active compound may be prepared by incorporating a non-solvent therefor. In that event, it is advantageous to add thereto any commercially available dispersing or surface active agent of the anionic or nonionic types.

The quantity of inert solid or liquid carrier or diluent with respect to the insecticidal compound is not critical. It has, however, been found that up to 10% by weight of the compound based on the weight of the inert carrier is generally sufficient. In most cases, from 1% to about 5% of the active ingredient can be employed effectively.

I claim:

1. A compound of the formula:

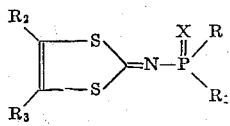

wherein X represents a member selected from the group consisting of sulfur and oxygen; R and $R_1$ represent members selected from the group consisting of lower alkyl, lower alkylthio, lower alkoxy, phenyl and $R_4$, $R_5$ N— wherein $R_4$ and $R_5$ are each selected from the group consisting of hydrogen and lower alkyl groups; and $R_2$ and $R_3$ are each selected from the group consisting of hydrogen, lower alkyl and phenyl.

2. The compound according to claim 1: 2-diethoxyphosphinylimino-1,3-dithiole.

3. The compound according to claim 1: 2-diethoxyphosphinylimino-4-methyl-1,3-dithiole.

4. The compound according to claim 1: 2-dimethoxyphosphinothioylimino-1,3-dithiole.

References Cited

UNITED STATES PATENTS 3,197,365   7/1965   Lovell _____ 260—327

JAMES A. PATTEN, *Primary Examiner.*